Patented June 23, 1925.

1,543,245

UNITED STATES PATENT OFFICE.

ALFRED CHARLES BUENSOD, OF NEW YORK, N. Y.

VARIABLE-TEMPERATURE METHOD OF CURING AND TREATING TOBACCO.

No Drawing. Application filed March 14, 1917, Serial No. 154,843. Renewed November 21, 1924.

*To all whom it may concern:*

Be it known that I, ALFRED CHARLES BUENSOD, a citizen of the United States of America, residing in the city, county, and State of New York, have invented a new and useful Variable-Temperature Method of Curing and Treating Tobacco, of which the following is a full, clear, and exact description.

My method of treating tobacco refers generally to the curing of tobacco and more particularly to treatment such as outlined in my co-pending applications Serial Nos. 154,842 and 154,844, each filed March 14, 1917, each of which describes a method of curing and treating tobacco, the former of which has eventuated into Patent Number 1,339,375, Jan. 3, 1923.

It is well known to those skilled in the art, that all tobacco, before it can be placed upon the market, must be cured. This treatment is such as to bring about certain chemical changes in the composition of the leaf; namely, the development of the desired color, the regulation of the temperature retaining capacity, the control of the texture, fire holding capacity and the elasticity, and the production of the proper keeping qualities of the tobacco.

When the green tobacco leaf is hung in an absolutely dark chamber, the action of the rays of light and the moisture supply through the root system being cut off, a period of starvation sets in, and the reserve supply of food stored in the leaf is consumed. It is necessary that tobacco be cured in the absence of the direct or the indirect rays of sunlight in order to extend the starving process. This is so because plant life is dependent upon a food supply, a water supply, and the agencies of the rays of sunlight for its development, and in curing, we deprive the plant of its source of water and its food supply and must also deprive it of the agencies of light. If light is present, although the food and water supply has been terminated, the rays of light acting upon the tobacco might cause a further growth of the tobacco by utilizing the water supply of the leaves and the food stored up therein. The green leaf always contains certain enzymes which take an active part in the chemical changes throughout the curing process, and, in the period of cell starvation, they are greatly increased. The formation of the color of the cured tobacco leaf is entirely due to the oxidation of the cell substance through the medium of an enzyme. These coloring enzymes act upon the cell substance and produce the various final colors in the leaf, depending upon the duration of the action, the amount of enzymes present, and the amount of moisture still retained by the cells, which moisture acts as a carrier. This oxidation may be so controlled as to produce a lemon yellow, an orange, a brown, a greenish brown, or a dark brown color. In the curing process, the intensity of the chemical actions and the time necessary for a thorough cure are dependent upon the temperatures used. The excess moisture of the leaf is liberated and must be carried away as the leaf is gradually starved and colored. If the moisture in the leaf is extracted rapidly, or if the leaf is subjected to unfavorable temperatures or poisons, the cells would be prematurely killed before the starch could be dissolved and the green color would thereby be set in the leaf. If the coloring enzymes were still alive they would act on the cell substance and produce colors showing over the green color of the leaf. To obtain the yellow color, it is necessary to slowly starve the leaf and to allow sufficient time for the starch to be dissolved, thereby causing the natural death of the cells.

In some types of tobacco, particularly that which is used for cigars, enzymes are required for further treatment of the leaf and hence the temperature used in the curing must not be high enough to kill them.

After the tobacco has been thoroughly cured, the moisture content thereof must be increased to a proper amount. This increase in moisture is necessary for two reasons: first, in order that breakage may not occur when handling the tobacco; secondly, that the tobacco may have the proper amount of moisture for further treatment. In the case of cigar tobacco a moisture content of 25% must be supplied.

The principal object of my invention has been to provide a continuous method of curing and treating tobacco, which preferably is carried on in darkness, and under conditions in which the temperature and relative humidity may be absolutely governed, so that the chemical changes going on in the leaf may be easily controlled, thereby producing the desired properties in the leaf.

In carrying out my invention, the green tobacco leaves are suspended in a suitable curing apparatus and subjected to continuously circulating air currents of a certain predetermined temperature and relative humidity. In my present method, the temperature of the air in the curing process is gradually raised and its percentage of relative humidity is maintained substantially at a uniform percentage until the tobacco has reached the desired stage, whereupon the temperature is decreased and the relative humidity raised, thus supplying the necessary moisture to avoid breakage in handling or for further treatment.

In practice, I prefer to use air at a temperature of from 70° to 80° F. and at a relative humidity of from 78% to 82%. The method is carried on under these conditions for a length of time sufficient to consume the surplus food contained in the leaf and cause the death of the cells. The temperature of the air is gradually raised to from 90° to 100° F. at the yellowing stage of the tobacco. The temperature is continuously increased until it reaches 120° to 130°, the humidity having been maintained at substantially the same percentage throughout the curing process. Before the tobacco is removed from the apparatus, the temperature is lowered to from 75° to 85° F. and the humidity is raised to from 80% to 85%, thus giving to the tobacco the necessary moisture content, in order that it may be handled without breakage or be in proper condition for further treatment.

The above method may be modified slightly by maintaining a substantially constant relative humidity throughout the major portion of the curing process and then lowering the humidity just before the curing process is completed. In this modified method, I prefer to start with air at a temperature of 70° F. and a relative humidity of 82%. The temperature of the air is raised to 90° F. while the relative humidity thereof is maintained at 82%. The temperature is now gradually increased to from 160° to 170° and the humidity is lowered to 65%, then the temperature is lowered to from 75° to 85° F. and the humidity increased to from 80% to 85% to replace in the tobacco the necessary moisture content.

Having thus described my invention, what I claim is:

1. A method of curing and treating tobacco which consists in subjecting it, for a sufficient time, to air currents having a temperature of from 70° to 80° F. and a relative humidity of from 78% to 82%, and then gradually raising the temperature of the air to from 90° to 100° F., while maintaining the relative humidity thereof as before, until the surplus food content in the leaf has been consumed and the cells have died.

2. A method of curing and treating tobacco which consists in subjecting it, for a sufficient time, to air currents having a temperature of from 70° to 80° F. and a relative humidity of from 78% to 82%, then gradually raising the temperature of the air to from 90° to 100° F., while maintaining the relative humidity thereof as before, until the surplus food content in the leaf has been consumed and the cells have died, then continuously increasing the temperature of such air currents until the temperature reaches a point between 120° and 130° F., while still maintaining the same percentage of relative humidity thereof, and then lowering the temperature of the air to from 75° to 85° F. and raising the relative humidity thereof to from 80% to 85%, until the necessary moisture content has been supplied for avoiding breakage in handling or for further treatment.

3. A method of curing and treating tobacco which consists in subjecting it, for a sufficient time, to air currents having a temperature of 70° F. and a relative humidity of 82%, and then gradually raising the temperature of the air to 90° F., while maintaining the relative humidity thereof as before, until the surplus food content in the leaf has been consumed and the cells have died.

4. A method of curing and treating tobacco which consists in subjecting it, for a sufficient time, to air currents having a temperature of 70° F. and a relative humidity of 82%, then gradually raising the temperature of the air to 90° F., while maintaining the relative humidity thereof as before, until the surplus food content in the leaf has been consumed and the cells have died, then continuously increasing the temperature of such air currents until the temperature reaches a point between 160° and 170° F. and lowering the relative humidity to 65%, and then lowering the temperature of the air to from 75° to 85° F. and raising the relative humidity thereof to from 80% to 85%, until the necessary moisture content has been added for avoiding breakage in handling or for further treatment.

5. A method of curing and treating tobacco which consists in subjecting it in darkness, for a sufficient time, to air currents having a temperature of from 70° to 80° F. and a relative humidity of from 78% to 82%, and then gradually raising the temperature of the air to from 90° to 100° F., while maintaining the relative humidity thereof as before, until the surplus food content in the leaf has been consumed and the cells have died.

6. A method of curing and treating tobacco which consists in subjecting it in darkness, for a sufficient time, to air currents having a temperature of from 70° to 80° F. and a relative humidity of from 78% to 82%, then gradually raising the temperature of the air to from 90° to 100°F., while maintaining the relative humidity thereof as before, until the surplus food content in the leaf has been consumed and the cells have died, then continuously increasing the temperature of such air currents until the temperature reaches a point between 120° and 130° F., while still maintaining the same percentage of relative humidity thereof, and then lowering the temperature of the air to from 75° to 85° F. and raising the relative humidity thereof to from 80% to 85%, until the necessary moisture content has been supplied for avoiding breakage in handling or for further treatment.

7. A method of curing and treating tobacco which consists in subjecting it in darkness, for a sufficient time, to air currents having a temperature of 70° F. and a relative humidity of 82%, and then gradually raising the temperature of the air to 90° F., while maintaining the relative humidity thereof as before, until the surplus food content in the leaf has been consumed and the cells have died.

8. A method of curing and treating tobacco which consists in subjecting it in darkness, for a sufficient time, to air currents having a temperature of 70° F. and a relative humidity of 82%, then gradually raising the temperature of the air to 90° F., while maintaining the relative humidity thereof as before, until the surplus food content in the leaf has been consumed and the cells have died, then continuously increasing the temperature of such air currents until the temperature reaches a point between 160° and 170° F. and lowering the relative humidity to 65%, and then lowering the temperature of the air to from 75° to 85° F. and raising the relative humidity thereof to from 80% to 85%, until the necessary moisture content has been added for avoiding breakage in handling or for further treatment.

In testimony whereof I have hereunto signed my name.

ALFRED CHARLES BUENSOD.